United States Patent

[11] 3,630,232

[72] Inventors Floyd Hasselriis
Astoria;
William M. Teller, Scarborough, both of N.Y.
[21] Appl. No. 25,038
[22] Filed Apr. 2, 1970
[45] Patented Dec. 28, 1971
[73] Assignee American Hydrotherm Corporation

[54] FLOW DIVERTER
10 Claims, 5 Drawing Figs.

[52] U.S. Cl. .......................................... 137/625.41
[51] Int. Cl. ........................................... F16k 11/00
[50] Field of Search ............................. 137/625.41, 625.42, 625.47, 597, 609

[56] References Cited
UNITED STATES PATENTS
| 1,929,405 | 10/1933 | Bilde | 137/625.47 X |
| 2,034,281 | 3/1936 | Buchholz | 137/625.41 X |
| 2,862,520 | 12/1958 | Cordova | 137/597 X |
| 3,136,339 | 6/1964 | Champion | 137/625.41 X |
| 3,375,849 | 4/1968 | Swartz | 137/625.41 X |
| 3,499,467 | 3/1970 | McCord et al. | 137/625.47 X |

FOREIGN PATENTS
| 976,646 | 11/1950 | France | 137/597 |
| 1,063,278 | 12/1953 | France | 137/597 |

Primary Examiner—Samuel Scott
Attorney—Marn & Jangarathis

ABSTRACT: A flow diverter particularly suited for diverting he flow of a heat transfer liquid to be employed in user equipment to either a heater, cooler or neither, to control the temperature thereof, comprising a housing including an intermediate wall or partition dividing the housing into two chambers. The wall is provided with three passages, one connecting the first and second chambers and the remaining two connecting the first chamber to two outlet ports to be connected to heater and cooler inlets, respectively. The first chamber is provided with an inlet port to be connected to the outlet of user equipment and a flow-diverting element for selectively connecting the passages in fluid flow communication with the first chamber. The second chamber is provided with two inlet ports to be connected to heater and cooler outlets, respectively, and an outlet port to be connected to the inlet of user equipment. The flow control element is constructed so as to balance the pressure forces on the top and bottom thereof thereby essentially eliminating the frictional forces which resist movement of the flow diverting element.

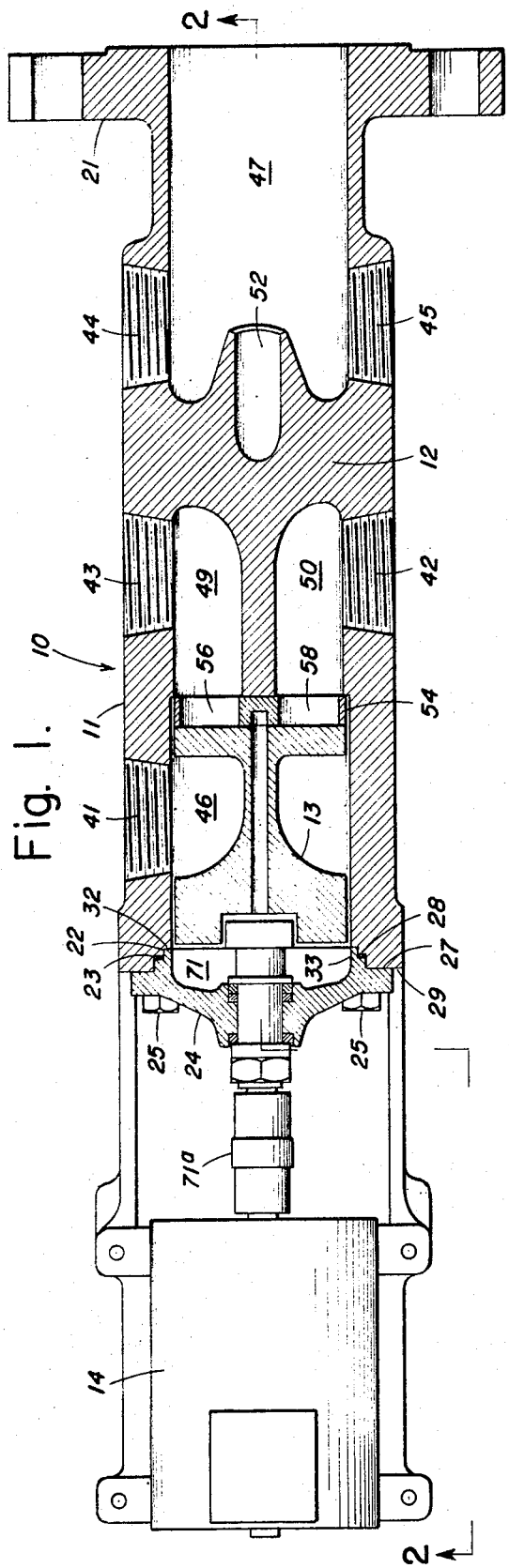
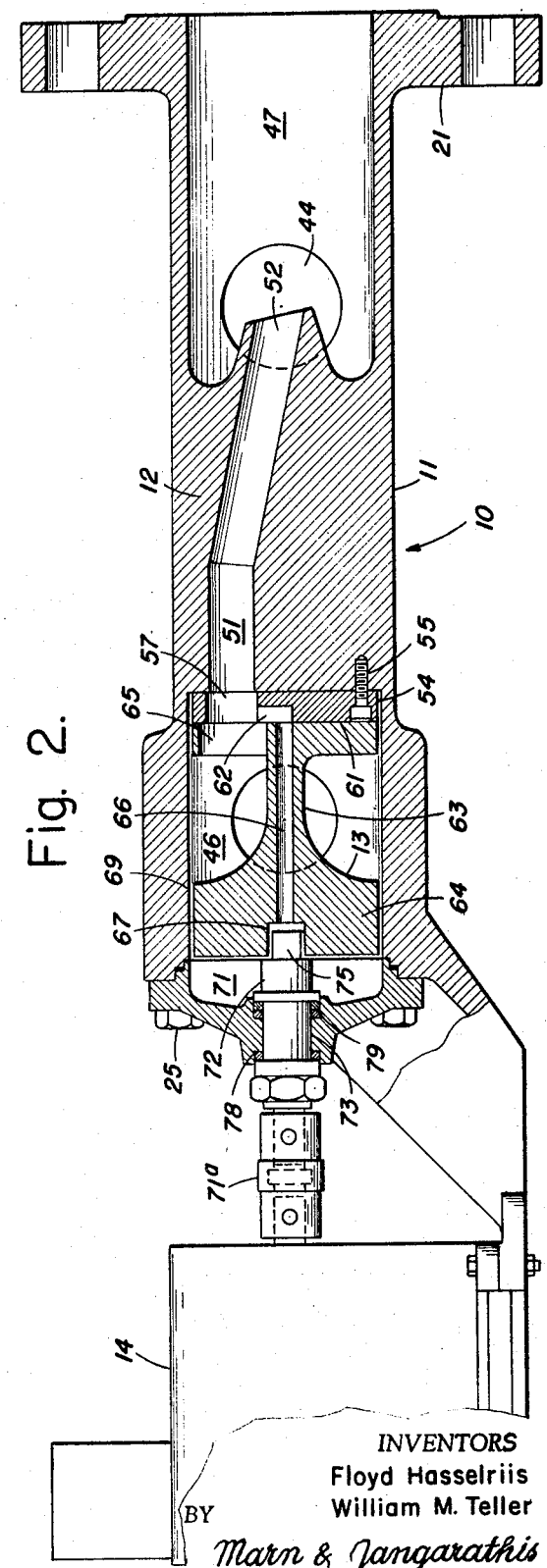

INVENTORS
Floyd Hasselriis
William M. Teller
BY Marn & Jangarathis
ATTORNEYS

FLOW DIVERTER

This invention relates to a flow diverter, and more particularly to a flow diverter particularly adapted for temperature regulation. Still more particularly, this invention relates to a flow diverter for directing the flow of a heat transfer liquid to be employed in user equipment to a cooler, heater or neither for regulating the temperature thereof.

In closed heating and cooling systems for providing heat transfer fluid to user equipment, such as kettles, extruders, blenders, heat exchangers, presses, mills, and the like, associated piping and controls must be provided to direct the heat transfer liquid to either a heater, a cooler or neither to control the temperature thereof. In general, such systems require two three-way valves for directing the heat transfer fluid to either the heater, cooler or neither, and the use of two three-way valves requires strict coordination of the opening and closing thereof in order to insure that the heat transfer fluid stops flowing to the heater as soon as the cooler is placed in the circuit and visa versa. The strict coordination of the valves is very difficult to achieve even with the use of specially designed and costly positioning and control devices.

In addition, many of the heating and cooling systems of the prior art require two pumps, one for each of the heating and cooling circuits, which also increases the overall cost of the system.

An object of this invention is to provide a new and improved flow diverter.

Another object of this invention is to provide a new and improved flow diverter particularly adapted for temperature regulation.

A further object of this invention is to provide a flow diverter which is particularly suited for directing flow to either a heater, a cooler or neither in a heating and cooling system.

Still another object of this invention is to provide an improved heating and cooling system having one flow diverter for directing heat transfer fluid to either a heater, a cooler or neither to regulate the temperature thereof.

These and other objects of the invention should be readily apparent from the following detailed description thereof when read with reference to the accompanying drawings wherein like reference to the accompanying drawings wherein like reference numerals designate like parts and wherein:

FIG. 1 is a cross-sectional view of an embodiment of the flow diverter of the invention;

FIG. 2 is a sectional view of the embodiment of the flow diverter of the invention taken along the line 2—2 of FIG. 1;

Figure 4:
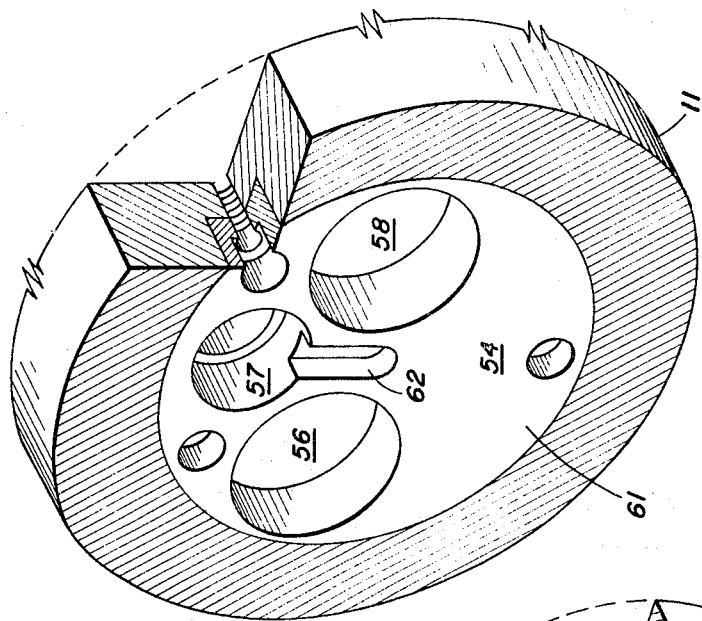
FIG. 4 is an isometric view, partially sectioned of the valve seat situated in the housing of the flow diverter of FIG. 1.
Figure 3:
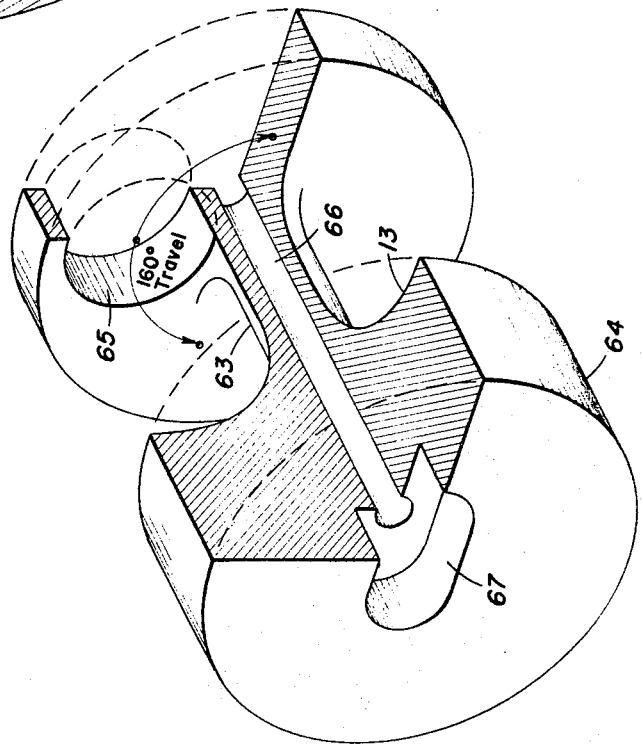
FIG. 3 is an isometric view, partially sectioned, of the flow-diverting element of the flow diverter of FIG. 1.

The objects of this invention are broadly accomplished by providing a flow diverter having three inlet ports to be connected to the outlets of user equipment, a heater and a cooler, respectively, three outlet ports to be connected to the inlets of the heater, the cooler and the user equipment, respectively, and a flow-diverting element to selectively direct flow of heat transfer fluid from the inlet port connected to the user equipment to the outlet ports. The flow diverter is also specifically constructed to reduce or substantially eliminate the pressure forces which cause frictional resistance to the movement of the diverting element.

The invention will be further described with reference to a preferred embodiment thereof illustrated in the accompanying drawings. It is to be understood, however, that the scope of the invention is not limited to the specific structure illustrated in the accompanying drawings:

Referring now to FIGS. 1 through 4 of the drawings there is shown a flow diverter 10 comprising a plurality of components, including: a housing 11, having an intermediate wall or partition 12; a flow diverting or controlling element 13; and an operator 14 for controlling the position of the diverting element 13.

The housing 11 has a radially outwardly extending flange 21 at the open end thereof for connecting the diverter 10 to other piping as generally known in the art, and the inner periphery of the other end of the housing 11 has circular stepped shoulders 22 and 23, which function as a seat for a cover or bonnet 24 is connected to the housing 11 by a plurality of circumferentially spaced fastening means, such as screws 25. and the lower portion of the cover or bonnet 24 is telescopically received in housing 11 and provided with circular shoulders 27 and 28 which are seated on the rim 29 and shoulder 23, respectively, of the housing 11, with the lower rim 32 of cover 24 being seated on shoulder 22 of housing 11. A fluidtight seal is maintained between the cover 24 and housing 11 by means of a gasket 33 positioned in sealing engagement with the shoulder 23 of housing 11 and shoulder 28 of cover 24. The housing 11 is further provided with an inlet port 41 at the closed end thereof, circumferentially spaced outlet ports 42 and 43 adjacent an intermediate portion of the wall 12 in housing 11 and circumferentially spaced inlet ports 44 and 45 at a point in the housing 11 adjacent the end of wall 12.

The intermediate wall 12 divides the housing 11 into chambers 46 and 47, with the inlet port 41 being positioned in chamber 46, and the circumferentially spaced inlet ports 44 and 45 being positioned in chamber 47. The outer periphery of intermediate wall 12 is provided with three circumferentially spaced fluid flow passages, 49, 50 and 51, the passages 49 and 50 being larger than the passage 51. The passages 49 and 50 are positioned along the periphery of the wall 12 adjacent the portion of the housing having outlet ports 43 and 42, respectively, the passages 49 and 50 extending longitudinally through the wall 12 to a point at which the passages 49 and 50 are in direct fluid flow communication with the outlet ports 43 and 42, respectively, thereby placing the chamber 46 in fluid flow communication with the outlet ports 43 and 42. The passage 50 extends longitudinally through the wall 12 parallel to the axis of the housing 11 through a first portion of the wall 12, and then longitudinally inwardly through the remaining portion of the wall 12 terminating in a nozzlelike outlet 52 in the chamber 47, adjacent the inlet ports 44 and 45, thereby placing chambers 46 and 47 in fluid flow communication. The nozzlelike outlet 52 for the passage 51 provides a venturi effect to provide the flow potential required to cause flow into the inlet ports 44 and 45 from their associated piping.

A flat wear plate 54 having a circular cross section is removably fastened to the surface of wall 12 in chamber 46 by suitable fastening means, such as circumferentially spaced screws 55, the plate 54 providing a replacable seat for the flow-diverting element 13. The plate 54 is provided with ports 56, 57 and 58 which are sized and spaced thereon to correspond to the size and spacing of passages 49, 51 and 50, respectively, the plate 54 being fastened to wall 12 so that the ports 56, 57 and 58 register with the passages 49, 51 and 50, respectively. The surface 61 of the plate 54 adjacent chamber 46 is further provided with a groove 62 which extends radially inwardly from the ports 57 of plate 54 to the center of plate 54.

The flow diverting or controlling element 13 is comprised of a lower flat plate portion 62 having a circular cross section and central neck or stemlike portion 63 curving outwardly into an enlarged piston-shaped head 64 having a diameter equal to the diameter of the lower plate portion 62, the diameter of the head 64 and plate 62 being less than the internal diameter of chamber 46. The piston shape of the head 64 aids in the pressure balancing of the flow-diverting element, hereinafter described, but it should be understood that the head 64 may be shaped other than as described. The lower plate 62 of the flow-diverting element 13 is provided with a port 65 approximately equal in diameter to the diameter of the passages 49 and 50 through wall 12, and the flow-diverting element 13 further includes an axial bore 66 throughout the length thereof, terminating in an enlarged elliptically shaped counterbore 67 at the top of the enlarged head 64. The flow-diverting element 13 is positioned in chamber 46 radially spaced from the wall thereof, defining an annular passage 69 between the chamber 46 and a chamber 71 defined by the enlarged head 64 and the cover 24. The lower plate portion 62 of the flow control element 13 is rotatably slidingly seated on the plate 54, with the axial bore 66 of the flow-diverting element 13 being positioned in registration with the groove 62 on the surface 61 of plate 54 defining an enclosed flow passage thereon, whereby the chamber 71 is in direct fluid flow communication with the chamber 47 through axial bore 66, groove 62, port 57 and passage 51.

The annular passage 69 between the enlarged head 64 of the flow-diverting element 13 and the housing 11 provides direct fluid flow communication between chambers 46 and 71 causing a pressure drop therebetween substantially equal to the pressure drop between chambers 46 and 47 whereby pressures in chambers 71 and 47 are substantially balanced, thereby minimizing or essentially eliminating the pressure forces which would cause frictional resistance to rotation of the flow-diverting element 13, i.e., the forces on the top of the top portion of the flow-diverting element and the forces on the bottom of the bottom portion of the flow-diverting element are substantially equalized. The fluid which enters chamber 71 is continuously removed therefrom through a flow path defined by axial bore 61 in flow control element 13, the groove 62 on plate 54 and passage 51 in the partition or wall 12, the continuity of the aforesaid flow path being unaffected by movement of the flow-diverting element 13 as a result of the unrestricted passage formed by groove 62 on plate 54.

The flow-diverting element 13 is operated by the flow diverter operator 14, which is capable of rotating the flow-diverting element 13 over an arcuate path ranging from a position in which the port 65 thereof completely overlies the port 56 in plate 54 thereby placing the chamber 46 in fluid flow communication with the outlet port 43 through the ports 65 and 56 and the passage 49; to a position in which the port 65 thereof completely overlies the port 57 in plate 54, thereby placing the chamber 46 in fluid flow communication with the chamber 47 through the ports 65 and 57 and the passage 51; and to a position in which the port 65 thereof overlies the port 58 in plate 54, thereby placing the chamber 46 in fluid flow communications with the outlet port 42 through the ports 65 and 58 and the passage 50. It should be readily apparent that the port 65 of flow control element 13 may be positioned at intermediate points of such arcuate path, thereby placing the chamber 46 in fluid flow communication with both passages 49 and 51, or both passages 50 and 51.

The operating means 14 for rotating the flow-diverting element 13 may be any one of a wide variety of motors known in the art, and the motor is operatively connected to the flow-diverting element 13 through a suitable coupling, generally designated as 71a, linking the motor 14 to a stem 72 extending through a bore 73 in the cover 24 and connected to the enlarged head 64 of the flow-diverting element 13 by an end portion 75 elongated in one direction and telescopically received in the counterbore 67. The shorter dimension of the end portion 75 is slightly less than the corresponding dimension of the counterbore 67, whereby the application of a torque causes the end portion 75 to be offset and engagingly contact the surface of the counterbore 67 to provide a keylike engagement. It is to be understood, however, that the stem 72 may be connected to the flow-diverting element 13 other than as particularly described. A fluidtight seal is maintained between the stem 72 and the bore 73 by longitudinally spaced seals 78 and 79 sealingly positioned between the stem 72 and grooves in the bore 73 of cover 24.

The overall operation of the flow diverter 10 is particularly described with reference to FIG. 5 which illustrates a preferred use thereof; i.e., controlling the temperature of circulating liquid being supplied to user equipment, such as presses, mills, extruders, heat exchangers and the like.

Figure 5:
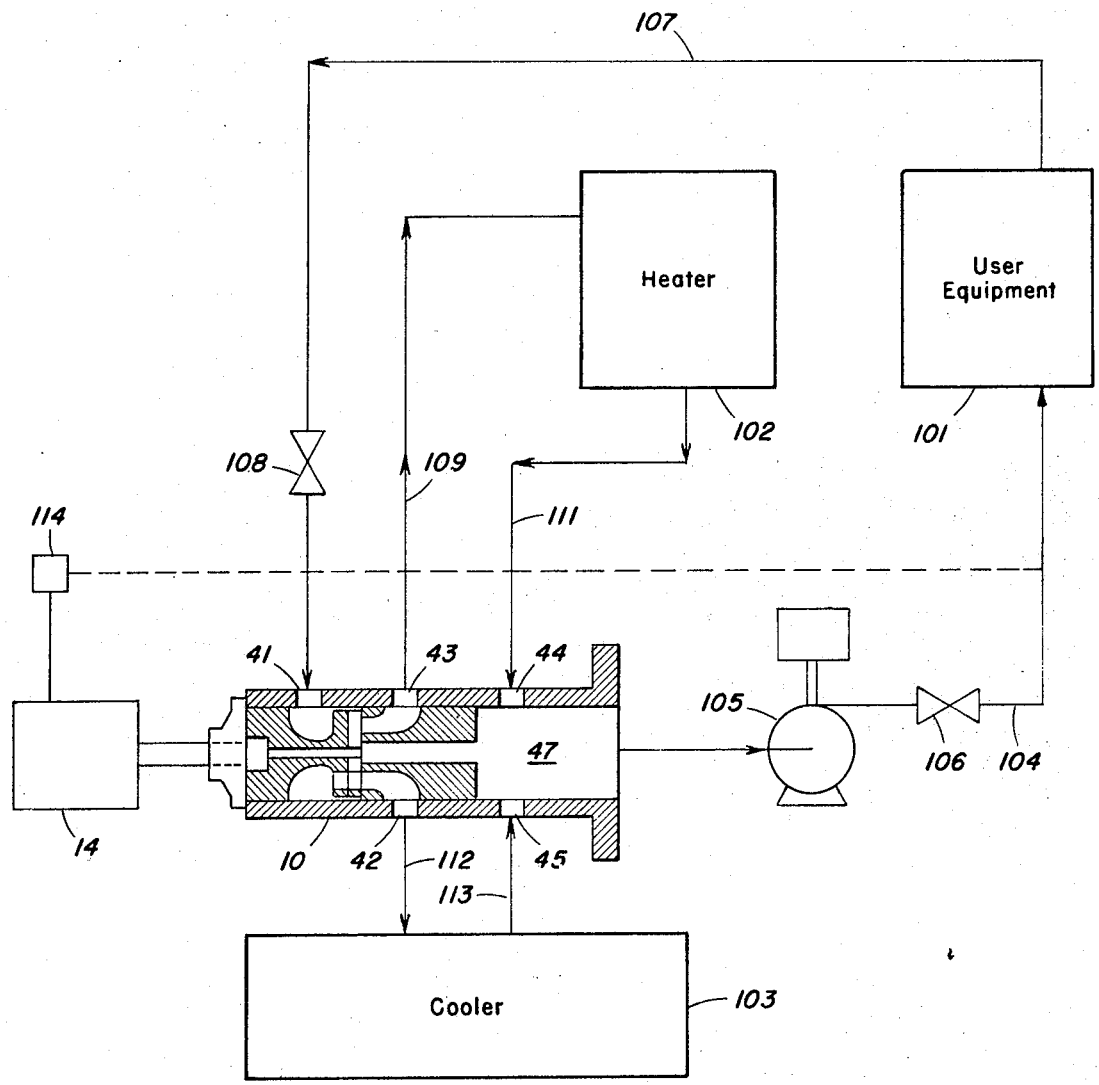
FIG. 5 is a simplified schematic representation of a heating and cooling system incorporating the flow diverter of FIG. 1.

Referring now to FIG. 5, there is illustrated user equipment generally designated as 101, a heater schematically illustrated as 102, a cooler schematically indicated as 103, and the flow controller or diverted 10 of the present invention. The heat transfer liquid inlet of the user equipment 101 is connected to the chamber 47 of the diverter 10 through conduit 104, including a pump 105 and valve 106, and the heat transfer liquid outlet of the user equipment 101 is connected to the inlet port 41 of flow diverter 10 through conduit 107, including a valve 108. The heat transfer liquid inlet of heater 102 is connected to the outlet port 43 of flow diverter 10 through conduit 109 and the heat transfer liquid outlet of heater 102 is connected to the inlet port 44 of flow diverter 10 through conduit 111. The heat transfer liquid inlet of cooler 103 is connected to outlet port 42 of flow diverter 10 through conduit 112, and the heat transfer outlet of the cooler 103 is connected to the inlet port 45 of diverter 10 through conduit 113. A temperature controller 114, of a type known in the art, controls the operation of motor 14 to maintain a predetermined temperature in conduit 104. Thus, the temperature controller 114 senses the temperature in conduit 104 and operates the motor 14 to cause movement of the flow-diverting element 13 to direct and proportion the flow of liquid between bypass, the cooler 103 and heater 102 to maintain the predetermined temperature.

In operation, the operator 14 controls the movement of the flow-diverting element 13 to maintain the desired heat transfer liquid temperature, which may require heating of all or a portion of the heat transfer liquid, cooling of all or a portion of the heat transfer liquid or neither. If heating of all of the heat transfer liquid is required to maintain the desired temperature, the temperature controller 114 sends a signal to operator 14 causing movement of the flow-diverting element 13 to a position in which the port 65 thereof only overlies port 56 of plate 61, directing all of the heat transfer liquid introduced into the flow diverter 10 through inlet port 41 to heater 102 through passage 49, outlet port 41 and conduit 109, the liquid from the heater 102 being returned to the user equipment 101 through conduit 111, inlet port 44, chamber 47 and conduit 104. If heating of only a portion of the liquid is required to maintain the desired temperature, the operator 14 in response to a signal from temperature controller 114 moves flow-diverting element 13 to a position in which the port 65 thereof overlies both ports 56 and 57 of plate 61, directing a portion of the liquid introduced through inlet port 41 to heater 102, as hereinabove described, and directing the remaining portion thereof to chamber 47 through passage 51, thereby bypassing both the heater and cooler. The amount of flow to 51 is proportioned to provide the desired temperature, with the total flow through conduit 104 remaining substantially constant.

If cooling of all the heat transfer liquid is required to maintain the desired temperature, the temperature controller 114 sends a signal to operator 14, causing movement of the flow diverting element 13 to a position in which the port 65 thereof only overlies port 58 of plate 61, directing all of the heat transfer liquid introduced into the diverter 10 through inlet port 41 to the cooler 103 through passage 50, outlet port 42 and conduit 112, the liquid from the cooler 103 being returned to the user equipment 101 through conduit 113, port 45, chamber 47 and conduit 104. If cooling of only a portion of the liquid is required to maintain the desired temperature, the operator 14 in response to a signal from temperature controller 114 moves the flow-diverting element 13 to a position in which the port 65 thereof overlies both ports 57 and 58 of plate 61, directing a portion of the liquid introduced through port 41 to the cooler 103, as hereinabove described, and directing the remaining portion thereof to bypass both the heater 102 and cooler 103 by flowing to chamber 47 through passage 51. The amount of flow is proportioned between the cooler 103 and bypass to maintain the desired temperature, with the total flow through conduit 104 remaining substantially constant.

If neither heating nor cooling is required to maintain the desired temperature, the flow-diverting element 13 is moved to a position in which the port thereof only overlies port 57 of plate 61, directing all of the flow through passage 51, thereby bypassing both the heater and cooler.

The hereinabove described embodiments of the invention may be modified in numerous ways within the spirit and scope of the invention. Thus, the flow-diverting element may be constructed and operated in a manner other than as particularly described. For example, the flow-diverting element may be constructed and operated as a gate which slides in a direction parallel to the valve seat instead of rotating thereon. In such a modification the flow passages or ports would be aligned with each other. Alternatively, the diverting element may be in the shape of a ball or sphere which rotates to open and close the various passages or ports.

As a further modification, the flow-diverting element may be constructed and operated to move axially in the housing to open and close outlet ports axially positioned along the housing. In this modification, the diverting element, including a port in fluid flow communication with the inlet chamber, would slidingly engage the housing, with the port thereof being selectively placed in communication with three different axially spaced outlet ports, the center one of which is connected to the outlet chamber to provide a bypass passage. Thus, as should be apparent, the diverting element may take anyone of a wide variety of shapes and operate in sliding or rotating fashion, provided the diverting element selectively places the inlet port in communication with three outlet ports or passages in the manner hereinabove described.

Similarly, the pressure balancing to essentially eliminate the frictional forces which oppose movement of the flow-diverting element requires removal of fluid which flows into the chamber formed by the top portion of the diverting element, and this may be accomplished in a manner other than as particularly described. Thus, for example, the fluid may be passed to the outlet chamber in a manner other than through a groove on the plate forming a valve seat.

As still another modification, the inlet ports to the outlet chambers which are connected to the heater and cooler outlets may be provided with flow control elements which would permit a single heater and single cooler to be attached to several flow diverters for several different user equipments.

The above modifications and numerous other modifications should be readily apparent to those skilled in the art from the teachings herein.

The flow diverter of the invention is particularly advantageous in that a single element is capable of directing flow to either the heater of cooler in varying proportions or to neither the heater or cooler, thereby eliminating the necessity of employing two three-way valves. The use of the flow diverter of the present invention provides continuous modulation over the full range from complete heating to complete cooling, without the necessity of employing special and costly positioning devices and controls to coordinate the operation of two valves. Thus, the flow diverter of the invention may be operated by a simple motor having a forward and reverse control.

In addition, the pressure balancing the flow-diverting element essentially eliminates the frictional forces which oppose movement thereof, thereby substantially reducing the power requirement for the operator.

Furthermore, the use of an internal bypass having a nozzle like outlet results in venturi effect which provides the pressure differential for circulating fluid through the heating and cooling circuits, thereby eliminating the necessity for providing pumps for both the heating and cooling circuits. A single pump employed in the user equipment circuit provides the overall pressure differential for maintaining flow.

The above advantages and other advantages should be apparent to those skilled in the art from the teachings herein.

Numerous modifications and variations of the present invention are possible in light of the above teachings and therefore it is to be understood that the invention may be practiced in a manner other than as particularly described.

What is claimed is:

1. A flow diverter comprising: a closed housing, including first, second and third inlet ports and first, second and third outlet ports; a wall dividing the housing into first and second chambers; the first inlet port being connected to the first chamber, the second and third inlet ports being connected to the second chamber and the first outlet port being connected to the second chamber; means for placing the first and second chambers in fluid flow communication with each other; and a flow-diverting means positioned in the first chamber for selectively placing the first chamber in and out of fluid flow communication with the second outlet port, the third outlet port and said means for placing the first and second chambers in fluid flow communication, respectively.

2. The flow diverter as defined in claim 1 wherein the flow-diverting means includes dividing means spaced from the interior of the housing defining a narrow passage therebetween, said dividing means forming with the housing a third chamber in fluid flow communication with the first chamber through the narrow passage, said fluid-diverting means further including means for placing the third chamber in fluid flow communication with the second chamber.

3. The flow diverter as defined in claim 1 wherein the means connecting the first and second chambers comprises a first passage through said wall and said second and third outlet ports being connected to the housing adjacent an intermediate portion of the wall, said wall further including second and third passages connecting the first chamber to the second and third outlet ports, respectively, the fluid-diverting means selectively opening and closing the first, second and third passages.

4. A flow diverter comprising: a closed housing, including an intermediate wall dividing the housing into first and second chambers; a first passage in the wall connecting the first and second chambers; a first outlet in the housing adjacent an intermediate portion of the wall; a second passage through the wall connecting the first chamber with the first outlet; a second outlet in the housing adjacent an intermediate portion of the wall; a third passage through the wall connecting the first chamber with the second outlet; a first inlet in the housing communicating with the first chamber; a second inlet in the housing communicating with the second chamber; a third inlet in the housing communicating with the second chamber; a third outlet in the housing communicating with the second chamber; a flow-diverting means being movably mounted in the first chamber, a portion of the flow-diverting means defining with the housing a third chamber in fluid flow communication with the first chamber through a narrow passage, said flow-diverting means including means for placing the third chamber in fluid flow communication with the second chamber; and operator means connected to the flow-diverting means to effect movement thereof to register the port thereof with the first, second and third passages to thereby selectively open and close the first, second and third passages.

5. The flow diverter as defined in claim 4 wherein the flow-diverting means comprises a bottom portion, a top portion and an intermediate portion of narrower cross section than the top and bottom portions, said bottom potion including the port, said top portion defining with the housing the third chamber, the sides of the top portion being spaced from the housing defining said narrow passage.

6. The flow diverter as defined in claim 5 and further comprising a valve seat positioned in the first chamber having one surface thereof in engagement with the intermediate wall, said valve seat including first, second and third ports in registration with the first, second and third passages, the bottom portion of said flow-diverting means movably engaging another surface of said valve seat whereby the flow-diverting means opens and closes the first, second and third passages by selective registration of the port thereof with the first, second and third ports of the valve seat.

7. The flow diverter as defined in claim 6 wherein the other surface of the valve seat includes a groove in registration with the first port and the means of the flow-diverting means for placing the third chamber in fluid flow communication with the second chamber comprises a passage extending through the top, intermediate and bottom portion of the flow-diverting means in registration with the groove on the valve seat, whereby fluid flows from the third chamber through the passage in the flow-diverting means, the groove on the valve seat, the first port and the first passage into the second chamber.

8. The flow diverter as defined in claim 7 wherein the first port and first passage are positioned between and immediately adjacent to the second and third ports and the second and third passages, respectively, whereby the port of the flow-diverting means can simultaneously open portions of and proportion flow through the first and second passages and the first and third passages, respectively.

9. The flow diverter as defined in claim 8 wherein the first passage includes a nozzle-shaped outlet in said second chamber, said second and third inlets being positioned in the housing adjacent said nozzle-shaped outlet, whereby fluid flowing from said nozzle-shaped outlet enhances flow through said second and third inlets.

10. The flow diverter as defined in claim 9 wherein the valve seat is a flat plate removably secured to the wall and the top portion of the flow-diverting means has a piston shape.

* * * * *